United States Patent
Coppola et al.

(10) Patent No.: US 11,338,512 B2
(45) Date of Patent: May 24, 2022

(54) METHOD OF FORMING CHANNELS WITHIN A SUBSTRATE

(71) Applicant: GM GLOBAL TECHNOLOGY OPERATIONS LLC, Detroit, MI (US)

(72) Inventors: Anthony M. Coppola, Rochester Hills, MI (US); Nicole Ellison, Madison Heights, MI (US); Hugh MacDowell, Clawson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 170 days.

(21) Appl. No.: 16/701,528

(22) Filed: Dec. 3, 2019

(65) Prior Publication Data

US 2021/0162672 A1   Jun. 3, 2021

(51) Int. Cl.
*B29C 59/08* (2006.01)
*B29D 22/00* (2006.01)
(Continued)

(52) U.S. Cl.
CPC .............. *B29C 64/30* (2017.08); *B33Y 40/20* (2020.01); *B33Y 70/00* (2014.12); *B29K 2105/0017* (2013.01); *B29L 2031/18* (2013.01)

(58) Field of Classification Search
CPC ..... B29C 59/08; B29D 22/00; B29L 2022/20; B29L 2031/18
(Continued)

(56) References Cited

U.S. PATENT DOCUMENTS 4,769,902 A * 9/1988 Mehta ................. H01H 37/761
164/34
4,911,770 A * 3/1990 Oliver ................. B01F 3/0807
149/109.6
(Continued)

FOREIGN PATENT DOCUMENTS

CN        112895255 A     6/2021
DE    102018130561 A1     6/2019
(Continued)

OTHER PUBLICATIONS

3M Global Technology Operations; U.S. Appl. No. 15/981,190, filed May 16, 2018.
(Continued)

*Primary Examiner* — Leo B Tentoni
(74) *Attorney, Agent, or Firm* — Harness, Dickey & Pierce, P.L.C.

(57) ABSTRACT

Methods for forming channels within a substrate include molding a sacrificial component directly into the substrate and igniting the sacrificial component to deflagrate of the sacrificial component and form a channel in the substrate. The sacrificial component can include oxidizing agents such as chlorates, perchlorates, nitrates, dichromates, nitramides, and/or sulfates imbedded in a polymeric matrix, and the oxidizing agents can be 30 wt. % to 80 wt. % of the sacrificial component. The sacrificial component can further include one or more of unoxidized metal powder fuels, flammable gas-filled polymeric bubbles, one or more metallocenes and/or one or more metal oxide particles, one or more polymers with nitroester, nitro, azido, and/or nitramine functional groups, one or more burn rate suppressants such as oxamide, ammonium sulphate, calcium carbonate, calcium phosphate, and ammonium chloride, and non-combustible hollow bubbles and/or inert particles. The polymeric matrix can have a limiting oxygen index of less than about 30.

15 Claims, 1 Drawing Sheet

(51) Int. Cl.
*B29C 64/30* (2017.01)
*B33Y 70/00* (2020.01)
*B33Y 40/20* (2020.01)
*B29K 105/00* (2006.01)
*B29L 31/18* (2006.01)

(58) Field of Classification Search
USPC .......................................................... 264/80
See application file for complete search history.

(56) References Cited

U.S. PATENT DOCUMENTS

| | | | | |
|---|---|---|---|---|
| 5,520,826 A | * | 5/1996 | Reed, Jr | A62D 1/06 149/18 |
| 5,847,311 A | * | 12/1998 | Ryder | C06B 45/10 102/288 |
| 5,912,069 A | * | 6/1999 | Yializis | B32B 15/08 428/213 |
| 6,045,726 A | * | 4/2000 | Williams | C08K 5/29 106/18.21 |
| 7,722,782 B2 | * | 5/2010 | Coffey | F24V 30/00 252/70 |
| 9,976,815 B1 | * | 5/2018 | Roper | F28D 7/08 |
| 10,155,547 B1 | | 12/2018 | Coppola et al. | |
| 2017/0350260 A1 | * | 12/2017 | Dutta | F01D 5/147 |
| 2019/0168473 A1 | | 6/2019 | Ellison et al. | |
| 2019/0363598 A1 | | 11/2019 | Coppola et al. | |

FOREIGN PATENT DOCUMENTS

| | | |
|---|---|---|
| DE | 102019111533 A1 | 11/2019 |
| DE | 102019111729 A1 | 11/2019 |
| DE | 102019114586 A1 | 1/2020 |
| DE | 102020128762 A1 | 6/2021 |

OTHER PUBLICATIONS

3M Global Technology Operations; U.S. Appl. No. 15/989,988, filed May 25, 2018.
3M Global Technology Operations; U.S. Appl. No. 16/533,176, filed Aug. 6, 2019.
First Office Action for German Patent Application No. 102020128762.3 dated Mar. 18, 2021, with correspondence dated Mar. 31, 2021, from Manitz Finsterwald Patent—und summarizing contents; 3 pages.
Second Office Action for German Patent Application No. 102020128762.3 dated Jul. 2, 2021, with correspondence dated Jul. 20, 2021, from Manitz Finsterwald Patent—und summarizing contents; 7 pages.

* cited by examiner

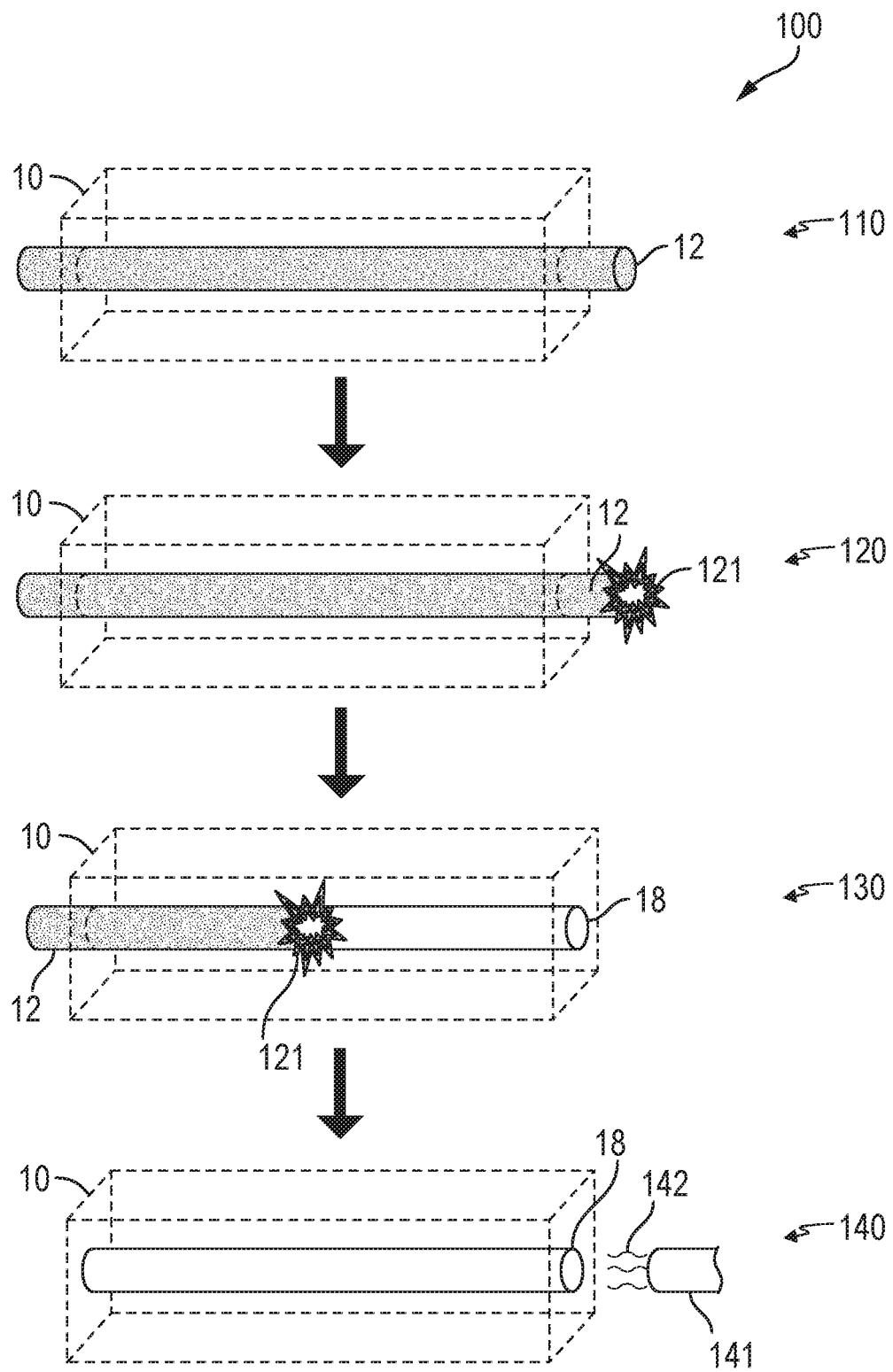

METHOD OF FORMING CHANNELS WITHIN A SUBSTRATE

BACKGROUND

The present disclosure relates to vascular channel manufacture by deflagration. For instance, the presently disclosed method can be used for forming channels within polymers, metals, or composites using deflagration of a sacrificial material. Vascular channel manufacturing in composite materials is often challenging and slow. Previously used sacrificial materials were difficult to remove consistently. For example, the melting and/or vaporizing has been used to remove sacrificial material. However, vaporization (i.e., thermal depolymerization) and melting removal methods can be slow and tend to leave residual material in the channels. Residual materials in turn restrict fluid flow. Deflagration is a rapid process and material left behind is easily removed. Also, the deflagration process described herein does not require the entire composite to be heated, unlike melting and vaporization. Heat generated through deflagration is rapidly dissipated to minimize thermal effects to the polymer composite (or another substrate).

SUMMARY

Provided are method of forming channels within a substrate, and include molding a sacrificial component directly into the substrate, and igniting the sacrificial component to cause deflagration of the sacrificial component, thereby forming a channel in the substrate. The sacrificial component can include one or more oxidizing agents imbedded in a polymeric matrix, the oxidizing agents can include one or more chlorates, perchlorates, nitrates, dichromates, nitramides, and/or sulfates, and the oxidizing agents can be 30 wt. % to 80 wt. % of the sacrificial component. The sacrificial component can further include one or more unoxidized metal powder fuels. The sacrificial component can further include flammable gas-filled polymeric bubbles. The sacrificial component can further include one or more metallocenes and/or one or more metal oxide particles. The sacrificial component can further include one or more polymers with nitroester, nitro, azido, and/or nitramine functional groups. The sacrificial component can further include one or more of oxamide, ammonium sulphate, calcium carbonate, calcium phosphate, and ammonium chloride. The sacrificial component can further include one or more non-combustible hollow bubbles and/or inert particles. The polymeric matrix can have a limiting oxygen index of less than about 30. The polymeric matrix can include less than 1 wt. % benzene moieties. The sacrificial component can include 5 wt. % to about 40 wt. % polymeric matrix, about 40 wt. % to about 75 wt. % oxidizing agents, and up to about 10 wt. % metal oxide and/or metallocene catalyst. The sacrificial component can further include up to about 20 wt. % unoxidized metal powder particles and up to about 50 v. % flammable gas-filled polymeric bubbles. The sacrificial component can further include up to about 50 wt. % inert particles, and up to about 20 wt. % burn rate suppressants.

Provided are sacrificial deflagration components, which can include a polymeric matrix which is 15 wt. % to 40 wt. % of the component, one or more oxidizing agents imbedded in the polymeric matrix and which are 50 wt. % to 75 wt. % of the component, and one or more metallocene and/or metal oxide catalysts. The oxidizing agents can include one or more chlorates, perchlorates, nitrates, dichromates, nitramides, and/or sulfates. The sacrificial deflagration component can include up to 10 wt. % of the one or more metallocene and/or metal oxide catalysts. The sacrificial deflagration component can further include up to about 20 wt. % unoxidized metal powders. The sacrificial deflagration component can further include up to about 50 v. % flammable gas-filled polymeric bubbles.

Provided are sacrificial deflagration components, which can include a polymeric matrix which is 15 wt. % to 40 wt. % of the component, one or more oxidizing agents imbedded in the polymeric matrix and which are 30 wt. % to 80 wt. % of the component, one or more metallocene and/or metal oxide catalysts, and one or more non-combustible fillers. The oxidizing agents can include one or more chlorates, perchlorates, nitrates, dichromates, nitramides, and/or sulfates. The sacrificial deflagration component can include up to 10 wt. % of the one or more metallocene and/or metal oxide catalysts. The sacrificial deflagration component can include up to about 50 wt. % non-combustible fillers. The sacrificial deflagration component can further include up to about 20 wt. % burn rate suppressants.

Other objects, advantages and novel features of the exemplary embodiments will become more apparent from the following detailed description of exemplary embodiments and the accompanying drawings.

BRIEF DESCRIPTION OF THE DRAWINGS

FIG. 1 illustrates a method for forming channels within a substrate, according to one or more embodiments.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations. As used herein, "wt. %" refers to a percent by weight, and "v. %" refers to a percent by volume.

FIG. 1 illustrates a method 100 for forming channels 18 within a substrate 10 using deflagration of a sacrificial component 12. As used herein, "deflagration" refers to controlled combustion without extreme detonation. Method 100 comprises molding 110 the sacrificial component 12 directly into the substrate 10, igniting 120 the sacrificial component 12 (e.g., using a flame or other heat or combustion inciter to cause an ignition 121) to cause deflagration 130 of the sacrificial component 12. Deflagration 130 converts the solid sacrificial material into gaseous and fine powder byproducts, thereby forming a channel 18 in the substrate 10. The sacrificial component 12 can be cylindrical in order to form the channel 18 with a cylindrical cross section, or can have other shapes, such as triangular, elliptical, square, etc. as desired. The sacrificial component 12 can have an unbranched or networked geometry to define the geometry of the desired resulting channel(s) 18. Method 100 can optionally further include cleaning 140 the channel 18 to remove byproducts of the deflagration of the sacrificial component 12. Cleaning 140 can comprise introducing a fluid 142 via a fluid source 141 into the channel 18 in some embodiments. The fluid 142 can be a liquid (e.g., water, organic solvents) and/or a gas (e.g., air).

Molding 110 generally comprises disposing the sacrificial component in a mold, filling the mold with liquid or uncured material (e.g., polymeric resin, uncured composite materials such as carbon fiber), and curing the material to form the substrate 10. Molding 110 the sacrificial component 12 directly into the substrate 10 can comprise partially molding 110 the sacrificial component 12 directly into the substrate 10 such that at least part of the sacrificial component 12 is disposed outside of the substrate 10 to provide an ignition 121 location. The substrate 10 can partially or wholly comprise a metal, a polymer, a polymer composite, or a continuous fiber composite material (e.g., carbon fiber, fiber glass), among others.

Method 100 is particularly advantageous for forming channels 18 in substrates 10 which are heat sensitive (e.g., electronics). For example, method 100 can be used to manufacture vascular cooled potted electronics, an engine control unit or touch screen on an instrument, biomedical implants, battery enclosures and cooling fins, and vascular engines and motors, among others. Method 100 can be used to manufacture automotive and non-automotive components such as intake ports in polymer composite engine head assemblies, engine block water jackets, transmission casing oil galleries, composite chassis comprising localized hollow sections, polymer composite structural members comprising undercut sections, and composite (e.g., carbon fiber) suspension arms and bicycle frames.

The composition of sacrificial component 12 allows for rapid deflagration 130 but not extreme detonation which would damage the substrate 10. The heat generated during deflagration is dissipated rapidly enough to prevent damage to the substrate 10, and the deflagration 130 products are easy to remove, such as fine powdered and large volumes of gaseous species. The sacrificial component 12 is further self-oxidizing to burn in a small diameter along long channels, resistant to molding 110 pressures, shelf stable, and stable during manufacturing (i.e., the ignition temperature is greater than the manufacturing or processing temperature). The term "ignition temperature" means the lowest temperature at which body of a combustible material (e.g., sacrificial component 12) will ignite, when given an ignition 121 source. The sacrificial component 12 is molded 110 directly to the substrate 10 at a processing temperature that is less than the flash point of the combustible material to avoid deflagration during the manufacturing process. The term "processing temperature" means a temperature required to perform a manufacturing operation, such as molding or casting 110. For example, the processing temperature can be the melting temperature of the material forming the substrate 10 (i.e., the melting temperature of the polymeric resin forming the substrate 10).

In some embodiments the sacrificial component 12 can be formed using an additive manufacturing process, particularly when a sacrificial component with a complex geometry is required. Accordingly, substrates 10 with channels 18 having complex shapes can be created. The term "additive manufacturing process" refers a process in which a 3D object is built by adding layer-upon-layer of material. 3D printing process is a kind of additive manufacturing process. In the case of 3D printing, a 3D Computer Aided Design (CAD) model, or the like, can read by a computer, and the computer can command a 3D printer to add successive layers of material to create a 3D object that corresponds to the 3D CAD model.

The composition of the sacrificial component 12 is tailored to provide a burn characteristic which minimizes heat transfer to the substrate 10 during deflagration 130 yet provide a thermal energy sufficient to maintain a suitable burn rate. The sacrificial component 12 comprises one or more oxidizing agents imbedded in a combustible polymeric matrix, and optionally further comprises one or more additives described below. The polymeric matrix comprises one or more polymers and acts as a binder for the one or more oxidizing agents and optional additives, and can be selected to optimize materials properties (e.g., flexibility, stiffness, durability) relevant to manufacturing processes such as method 100. For example, the sacrificial component 12 must be physically robust sufficient to resist deformation and/or breaking during molding 110, and substantially impermeable to the substrate 10 material prior to completion of molding 110 (e.g., substantially impermeable to a resin which will cure and form the substrate 10 during molding 110). Additionally, the polymeric matrix ideally forms minimal solid combustion products (e.g., char) and toxic combustion byproducts (e.g., chlorine and sulfur compounds, heavy metals) during deflagration 130. Accordingly, polymeric materials can be selected to minimize benzene rings, and toxic compound-forming moieties. In some embodiments, the polymeric matrix comprises polymers with substantially no benzene moieties (i.e., less than 1 wt. %).

The polymeric matrix can comprise one or more thermosetting polymers, one or more thermoplastic polymers, and combinations thereof. In general, the polymeric matrix is easily combustible and ideally breaks down at lower temperatures and has high combustion efficiency. Accordingly, in some embodiments the polymeric matrix can have a limiting oxygen index of less than about 30, or less than about 21. The limiting oxygen index defines the minimum percentage of oxygen by volume in a gas required to support combustion of a polymer after ignition (e.g., deflagration 130). The one or more thermosetting polymers can include epoxies, polyurethanes, furans, melamines, polyimides, polyesters, phenolics, polybutadienes, benzoxazines, cyanate esters, vinyl esters, urea-formaldehydes, polyurea, bismaleimides, and elastomers, for example. The one or more thermoplastic polymers can include polypropylenes, polyethylenes, ABS, acrylics, polylactic acids, polybenzimidazole, polycarbonate, polyether sulfone, polyoxymethylene, polyetherether ketone, polyetherimide, polyethylene, polyphenylene oxide, polyphenylene sulfide, polystyrene, and polyvinyl chloride, for example. Thermoplastic polymers are particularly suitable for use in sacrificial components 12 which are formed by additive manufacturing processes (e.g., 3D printed) discussed above.

The one or more oxidizing provide a source of oxygen for the deflagration reaction and allow the same reaction to occur within a closed channel 18 (i.e., without the need for delivery of external air or concentrated oxygen). Further, the oxidizing agents accelerate deflagration of the polymeric matrix relative to combustion of the polymeric matrix in atmospheric air. Generally, an increasingly smaller oxidizing agent particle size increases the rate of deflagration. In some embodiments, the one or oxidizing agents can have a micro-scale average particle size, for example about 1 µm to about 500 µm, or about 10 µm to about 100 µm. The one or more oxidizing agents can comprise chlorates (e.g., potassium chlorate), perchlorates (e.g., ammonium perchlorate, potassium perchlorate), nitrates (e.g., ammonium nitrate, guanidine nitrate, potassium nitrate, strontium nitrate, sodium nitrate, barium nitrate), dichromates (e.g., potassium dichromate, ammonium dichromate), nitramides (e.g., ammonium dinitramide), and sulfates (e.g., strontium sulfate, sodium sulfate, barium sulfate), for example.

The one or more oxidizing agents can be mixed stoichiometrically with the polymeric matrix or can be mixed at an oxidizer-rich level to ensure/enhance deflagration. For example, the one or more oxidizing agents can comprise at least about 40 wt. %, or at least about 50 wt. % of the sacrificial component 12. In some embodiments the oxidizing agents can comprise about 30 wt. % to about 80 wt. %, or about 40 wt. % to about 75 wt. % of the sacrificial component 12. Without or without optional additives, discussed below, the polymeric matrix then generally comprises the balance of the sacrificial component. For example, the polymeric matrix can comprise about 25 wt. % to about 60 wt. %, or about 15 wt. % to about 40 wt. % of the sacrificial component.

The sacrificial component 12 can further comprise one or more additives imbedded within the polymeric matrix to enhance or otherwise tailor the burn characteristics of the sacrificial component 12. A specific type of additive includes fuels, which generally increase the exothermic characteristics of the sacrificial component 12. Fuels can comprise unoxidized metal powders (e.g., aluminum powder, magnesium powder) and/or flammable gas-filled polymeric bubbles. The unoxidized metal powders can have a micro-scale average particle size (e.g., about 1 µm to about 500 µm, or about 10 µm to about 100 µm). The unoxidized metal powders can comprise up to about 10 wt. %, up to about 15 wt. %, or up to about 20 wt. % of the sacrificial component 12. In some embodiments the unoxidized metal powders can comprise a non-zero value of up to about 10 wt. %, up to about 15 wt. %, or up to about 20 wt. % of the sacrificial component 12. The flammable gas-filled polymeric bubbles can comprise a polymeric shell (e.g., thermoplastic polymers such as polyester, polyurethane, polystyrene, polyvinyl chloride) encasing a flammable gas (e.g., pentane, butane, dichloroethylene, methylpentane). The polymeric shell can have a diameter of about 10 µm to about 100 µm and a wall thickness of about 0.05 µm to about 1 µm, although other diameters and wall thicknesses are practicable. The flammable gas-filled polymeric bubbles can comprise up to about 35 v. %, up to about 40 v. %, up to about 45 v. % of the sacrificial component 12, or up to about 50 v. % of the sacrificial component 12. In some embodiments, the flammable gas-filled polymeric bubbles can comprise a non-zero value up to about 35 v. %, up to about 40 v. %, up to about 45 v. %, or up to about 50 v. % of the sacrificial component 12.

A specific type of additive includes catalysts, which generally promote deflagration 130 by lowering the activation every of the sacrificial component 12 and/or increasing the reaction (i.e., deflagration) rate. Catalysts can include one or more metallocenes (e.g., ferrocene, catocene), and metal oxide particles (e.g., iron oxides, copper oxides, chromium oxides, manganese oxides). The catalysts can have a micro-scale average particle size, for example about 1 µm to about 500 µm, or about 10 µm to about 100 µm. In some embodiments, the catalysts can have a nano-scale average particle size, for example about 1 nm to about 500 nm, or about 10 nm to about 100 nm. In some embodiments the catalysts can have a nano-scale average particle size, for example about 1 nm to about 500 nm, or about 10 nm to about 100 nm. The catalysts can comprise up to about 10 wt. %, or about 1 wt. % to about 10 wt. % of the sacrificial component 12.

A specific type of additive includes energetic binders, which are generally chemically/thermodynamically unstable and/or include a large amount of stored chemical energy such that inclusion within the polymeric matrix increases or otherwise promotes deflagration 130. Energetic binders can include polymers (e.g., polyesters, polyamides, polyurethanes, polyacrylates) with nitroester, nitro, azido, or nitramine functional groups. Some specific examples of energetic binders include glycidyl azide, pentaerythritol tetranitrate, nitrocellulose, pyrocellulose, poly(vinyl nitrate), polynitrophenylene, nitroamine, and poly(phosphzenes). In some embodiments the energetic binders can comprise 30 wt. % of the sacrificial component 12.

A specific type of additive includes burn rate suppressants, which are generally enothermic compounds used to slow the deflagration 130 rate, or otherwise minimize the deflagration 130 temperature of the sacrificial component 12. Burn rate suppressants can include one or more of oxamide, ammonium sulphate, calcium carbonate, calcium phosphate, and ammonium chloride, and are commonly included in sacrificial components 12 used to form large (e.g., 10 cm diameter) channels 18. The burn rate suppressants can have a nano-scale average particle size, for example about 1 nm to about 500 nm, or about 10 nm to about 100 nm. In some embodiments the burn rate suppressants can have a micro-scale average particle size, for example about 1 µm to about 500 µm, or about 10 µm to about 100 µm. Generally, burn rate suppressants can be included in sacrificial components 12 in amounts which increase proportionately to the size of the channel 18 being formed therewith. For example, a sacrificial component 12 used to form a channel 18 with an average diameter of 5 cm may comprise about 2 wt. % to about 7 wt. % burn rate suppressants, whereas a sacrificial component 12 used to form a channel 18 with an average diameter of 20 cm may comprise about 10 wt. % to about 20 wt. % burn rate suppressants.

A specific type of additive non-combustible fillers, which are generally gases or compounds used to slow the deflagration 130 rate, or otherwise minimize the deflagration 130 temperature of the sacrificial component 12. Non-combustible fillers can include porosity within the polymeric matrix occupied by non-flammable gases (e.g., air, $N_2$, $CO_2$), which can be formed using a foaming binder, for example. Non-combustible fillers can also include hollow bubbles, for example bubbles with a glass, ceramic, or high limiting oxygen index polymeric shell. Non-combustible fillers can also include inert particles, such as ceramic (e.g., silica, alumina) or calcium carbonate particles. Such particles can have a micro-scale average particle size, for example about 1 µm to about 500 µm, or about 10 µm to about 100 µm. Generally, inert particles can be included in sacrificial components 12 in amounts which increase proportionately to the size of the channel 18 being formed therewith. For example, a sacrificial component 12 used to form a channel 18 with an average diameter of 5 cm may comprise about 5 wt. % to about 20 wt. % inert particles, whereas a sacrificial component 12 used to form a channel 18 with an average diameter of 20 cm may comprise about 30 wt. % to about 70 wt. % inert particles.

In some embodiments the sacrificial component can comprise about 15 wt. % to about 40 wt. % polymeric matrix, about 40 wt. % to about 75 wt. % oxidizing agent, up to about 5 wt. % or up to about 10 wt. % catalyst. Such a sacrificial component 12 can optionally further include one or more of up to about 20 wt. % unoxidized metal powder particles, up to about 40 v. % (i.e., up to about 1 wt. %) flammable gas-filled polymeric bubbles, up to about 50 wt. % inert particles, and up to about 20 wt. % burn rate suppressants.

The diameter of the sacrificial component 12, and the resulting channel 18 diameter can in some embodiments dictate the composition of the sacrificial component. For example, for a sacrificial component 12 with an average diameter of less than about 10 mm, less than about 7 mm, or less than about 5 mm, the sacrificial component can comprise about 15 wt. % to 40 wt. % polymeric matrix, about 50 wt. % to 75 wt. % oxidizing agents, and one or more metallocene and/or metal oxide catalysts. The one or more metallocene and/or metal oxide catalysts can collectively comprise up to about 10 wt. % of the sacrificial component. The metal oxide catalysts can comprise a mixture of iron oxide and copper oxide, in some embodiments. The sacrificial component can further comprise up to about 20 wt. % unoxidized metal powders. The sacrificial component can further comprise up to about 20 wt. % unoxidized metal powders and up to about 30 v. % or up to about 40 v. % (i.e., up to about 0.7 wt. % or up to about 1 wt. %) flammable gas-filled polymeric bubbles.

In other embodiments, wherein for a sacrificial component 12, and a resulting channel 18 diameter, with an average diameter of greater than about 5 mm, greater than about 7 mm, or greater than about 10 mm, the sacrificial component can comprise about 15 wt. % to about 40 wt. % polymeric matrix, about 40 wt. % to about 75 wt. % oxidizing agents, one or more metallocene and/or metal oxide catalysts, and one or more non-combustible fillers. The one or more metallocene and/or metal oxide catalysts can comprise up to about 10 wt. % of the sacrificial component 12. The metal oxide catalysts can comprise about a 0.8:1 to about a 1:0.8 ratio of iron oxide and copper oxide, in some embodiments. The one or more non-combustible fillers can comprise up to 50 wt. % of the sacrificial component 12. The sacrificial component 12 can further comprise up to about 20 wt. % burn rate suppressants.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that cannot be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of forming channels within a substrate, the method comprising:
   molding a sacrificial component directly into the substrate; and
   igniting the sacrificial component to cause deflagration of the sacrificial component and formation of a channel in the substrate,
   wherein the sacrificial component comprises one or more oxidizing agents imbedded in a solid polymeric matrix, the one or more oxidizing agents comprise potassium chlorate, guanidine nitrate, potassium nitrate, strontium nitrate, sodium nitrate, barium nitrate, potassium dichromate, ammonium dichromate, ammonium dinitramide, strontium sulfate, sodium sulfate, and/or barium sulfate, and the one or more oxidizing agents comprise 30 wt. % to 80 wt. % of the sacrificial component.

2. The method of claim 1, wherein the sacrificial component further comprises one or more unoxidized metal powder fuels.

3. The method of claim 1, wherein the sacrificial component further comprises flammable gas-filled polymeric bubbles.

4. The method of claim 1, wherein the sacrificial component further comprises one or more metallocenes.

5. The method of claim 1, wherein the sacrificial component further comprises one or more energetic binders, and wherein the one or more energetic binders comprise pentaerythritol tetranitrate, nitrocellulose, pyrocellulose, poly (vinyl nitrate), polynitrophenylene, nitroamine, and/or poly (phosphzene).

6. The method of claim 1, wherein the sacrificial component further comprises one or more of ammonium sulphate, calcium carbonate, calcium phosphate, and ammonium chloride.

7. The method of claim 1, wherein the sacrificial component further comprises one or more non-combustible hollow bubbles and/or inert particles.

8. The method of claim 1, wherein the polymeric matrix has a limiting oxygen index of less than about 21.

9. The method of claim 1, wherein the polymeric matrix comprises less than 1 wt. % benzene moieties.

10. The method of claim 1, wherein the sacrificial component comprises 5 wt. % to about 40 wt. % polymeric matrix, about 40 wt. % to about 75 wt. % oxidizing agents, and up to about 10 wt. % metal oxide and/or metallocene catalyst.

11. The method of claim 10, wherein the sacrificial component further comprises up to about 20 wt. % unoxidized metal powder particles and up to about 50 v. % flammable gas-filled polymeric bubbles.

12. The method of claim 10, wherein the sacrificial component further comprises up to about 50 wt. % inert particles, and up to about 20 wt. % burn rate suppressants.

13. The method of claim 1 further comprising:
   removing powder byproducts of the deflagration of the sacrificial component from the channel by introducing a fluid into the channel.

14. The method of claim 4, wherein the one or more metallocenes comprise ferrocene and/or catocene.

15. A method of forming channels within a substrate, comprising:
   molding a sacrificial component directly into the substrate; and
   igniting the sacrificial component to cause deflagration of the sacrificial component and formation of a channel in the substrate, wherein the sacrificial component comprises one or more oxidizing agents imbedded in a solid polymeric matrix, the one or more oxidizing agents comprise one or more dichromates, nitramides, and/or sulfates, and the one or more oxidizing agents comprise 30 wt. % to 80 wt. % of the sacrificial component.

* * * * *